(12) United States Patent
Hitomi et al.

(10) Patent No.: US 11,772,511 B2
(45) Date of Patent: Oct. 3, 2023

(54) VEHICLE-USE ENERGY STORAGE APPARATUS, VEHICLE-USE DISCHARGE SYSTEM, DISCHARGE CONTROL METHOD, AND VEHICLE-USE ENERGY STORAGE DEVICE

(71) Applicant: GS Yuasa International Ltd., Kyoto (JP)

(72) Inventors: Shuji Hitomi, Kyoto (JP); Yuya Asada, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 1023 days.

(21) Appl. No.: 16/343,189

(22) PCT Filed: Oct. 19, 2017

(86) PCT No.: PCT/JP2017/037805
§ 371 (c)(1),
(2) Date: Apr. 18, 2019

(87) PCT Pub. No.: WO2018/074538
PCT Pub. Date: Apr. 26, 2018

(65) Prior Publication Data
US 2019/0245363 A1 Aug. 8, 2019

(30) Foreign Application Priority Data
Oct. 21, 2016 (JP) .................... 2016-206814

(51) Int. Cl.
*H01M 10/44* (2006.01)
*H01M 4/46* (2006.01)
(Continued)

(52) U.S. Cl.
CPC ............. *B60L 58/13* (2019.02); *H01M 4/131* (2013.01); *H01M 4/134* (2013.01); *H01M 4/38* (2013.01);
(Continued)

(58) Field of Classification Search
CPC ........ H01M 10/44; H01M 4/46; H01M 4/134; H02J 7/0029
See application file for complete search history.

(56) References Cited

U.S. PATENT DOCUMENTS

| 2013/0164604 A1 | 6/2013 | Matsumoto |
| 2016/0254687 A1 | 9/2016 | Tanaka et al. |
| 2017/0012282 A1 | 1/2017 | Kondo |

FOREIGN PATENT DOCUMENTS

| EP | 2404341 B1 | 5/2017 |
| JP | H10334889 A | 12/1998 |

(Continued)

OTHER PUBLICATIONS

English Translation of WO-2016120917 (Year: 2016).*
(Continued)

*Primary Examiner* — Ula C Ruddock
*Assistant Examiner* — Frank A Chernow
(74) *Attorney, Agent, or Firm* — Rankin, Hill & Clark LLP

(57) ABSTRACT

Provided are a vehicle-use energy storage apparatus, a vehicle-use discharge system, a discharge control method, and a vehicle-use energy storage device each capable of ensuring a sufficient amount of electricity as an amount of electricity used during a normal use time while ensuring an amount of electricity which is reserved as spare electricity, and possessing a sufficient charge-discharge cycle. According to an aspect of the present invention, there is provided a vehicle-use energy storage apparatus including an energy (Continued)

storage device having a negative electrode including a negative active material which contains: a first active material made of a carbon material; and a second active material having a higher oxidation potential than the carbon material and having a higher capacity per volume than the carbon material. In performing discharging of the energy storage device, a main discharge reaction occurs in the first active material during a normal time, and the main discharge reaction occurs in the second active material during an emergency time.

9 Claims, 5 Drawing Sheets

(51) Int. Cl.
*H02J 7/00* (2006.01)
*B60L 58/13* (2019.01)
*H01M 4/587* (2010.01)
*H01M 10/0525* (2010.01)
*H01M 4/48* (2010.01)
*H01M 4/131* (2010.01)
*H01M 4/134* (2010.01)
*H01M 10/48* (2006.01)
*H01M 4/38* (2006.01)
*H01M 10/05* (2010.01)
*H01M 4/36* (2006.01)
*B60L 50/64* (2019.01)

(52) U.S. Cl.
CPC ............... *H01M 4/46* (2013.01); *H01M 4/48* (2013.01); *H01M 4/587* (2013.01); *H01M 10/05* (2013.01); *H01M 10/0525* (2013.01); *H01M 10/44* (2013.01); *H01M 10/48* (2013.01); *H02J 7/00* (2013.01); *B60L 50/64* (2019.02); *H01M 4/36* (2013.01); *H02J 7/00306* (2020.01)

(56) References Cited

FOREIGN PATENT DOCUMENTS

| | | |
|---|---|---|
| JP | 2012-018775 A | 1/2012 |
| JP | 2012049017 A | 3/2012 |
| JP | 2012065474 A | 3/2012 |
| JP | 2012-088286 A | 5/2012 |
| JP | 2012519940 A | 8/2012 |
| JP | 2013138566 A | 7/2013 |
| JP | 2014044921 A | 3/2014 |
| JP | 2014187007 A | 10/2014 |
| JP | 2016066579 A | 4/2016 |
| JP | 2016110917 A | 6/2016 |
| JP | S5978999 B2 | 8/2016 |
| JP | 2016170930 A | 9/2016 |
| JP | 2017107886 A | 6/2017 |
| JP | 2017123345 A | 7/2017 |
| WO | 2015025402 A1 | 2/2015 |
| WO | 2015114692 A1 | 8/2015 |
| WO | 2016120917 A1 | 8/2016 |

OTHER PUBLICATIONS

English Translation of JP 2012065474A (Year: 2012).*
International Search Report dated Jan. 23, 2018 filed in PCT/JP2017/037805.
Extended European Search Report (EESR) dated Oct. 9, 2019 issued in the corresponding European patent application No. 17861595.1.
Min Li et al., "Facile spray-drying/pyrolysis synthesis of core-shell structure graphite/silicon-porous carbon composite as a superior anode for Li-ion batteries", Journal of Power Sources, vol. 248, Feb. 1, 2014, pp. 721-728.; Cited in EESR.
Haegyeom Kim et al., "SnO2/graphene composite with high lithium storage capability for lithium rechargeable batteries", Nano Research, vol. 3, No. 11, Nov. 1, 2010, pp. 813-821.; Cited in EESR.

* cited by examiner

VEHICLE-USE ENERGY STORAGE APPARATUS, VEHICLE-USE DISCHARGE SYSTEM, DISCHARGE CONTROL METHOD, AND VEHICLE-USE ENERGY STORAGE DEVICE

TECHNICAL FIELD

The present invention relates to a vehicle-use energy storage apparatus, a vehicle-use discharge system, a discharge control method, and a vehicle-use energy storage device.

BACKGROUND ART

Various vehicles which use an energy storage apparatus as a power source have been developed. Such vehicles include an electric vehicle (EV), a hybrid electric vehicle (HEV), a plug-in hybrid electric vehicle (PHEV). As the above-mentioned energy storage apparatus, an energy storage apparatus which uses a lithium ion secondary battery has been popularly used from a viewpoint of high energy density or the like.

In such an electric vehicle or the like, the vehicle cannot be driven when an amount of electricity remaining in the energy storage apparatus is lowered to a predetermined value or less. Accordingly, there has been popularly performed a method where an occupant performs the supply of electricity with tolerance at a stage where a remaining amount of electricity is lowered to a certain level. However, in this case, frequent power supply becomes necessary and hence, it is difficult to ensure a sufficient traveling distance with a one-time supply of electricity. Accordingly, in a vehicle-use energy storage apparatus, a high electric capacity is one of important properties. In addition, in the vehicle-use energy storage apparatus, long-period durability that degradation of performance is small even when charging and discharging are repeatedly performed or the like is also important.

Under such circumstances, there has been proposed a controller of an electric vehicle where an energy storage apparatus includes a positive electrode made of a material which exhibits a first flat portion and a second flat portion in a discharge curve and whether discharging is to be continued or to be finished when a potential difference becomes a predetermined value can be selected (see Patent Document 1). It is described in patent literature 1 that the controller can perform further discharging using the above-mentioned second flat portion of the positive electrode when discharging is continued. As another technique which is substantially equal to the above-mentioned technique, there has been also developed a discharge control method of a vehicle-use secondary battery where a secondary battery which has two different discharge lower limit voltages is used, and the discharge lower limit voltage can be changed to a lower voltage by the selection made by an occupant (see Patent Document 2).

PRIOR ART DOCUMENTS

Patent Documents

Patent Document 1: JP 2012-65474 A
Patent Document 2: JP 2013-138566 A

SUMMARY OF THE INVENTION

Problems to be Solved by the Invention

The techniques described in the above-mentioned Patent Documents 1, 2 are simply configured such that a voltage range during a normal use time is set, and a remaining amount of electricity is discharged even when a discharge voltage reaches the set voltage range. That is, these techniques are merely configured such that a certain amount of electricity is reserved during a normal use time as spare electricity, and a state that an amount of electricity during a normal use time being totally consumed can be determined based on a voltage. That is, these techniques do not intend to increase an amount of electricity during a normal use time or an entire amount of electricity. Further, a charge-discharge cycle performance is not sufficiently taken into consideration in the above-mentioned techniques.

The present invention has been made in view of the above-mentioned circumstances, and it is an object of the present invention to provide a vehicle-use energy storage apparatus, a vehicle-use discharge system, a discharge control method, and a vehicle-use energy storage device each capable of ensuring a sufficient amount of electricity as an amount of electricity used during a normal use time while ensuring an amount of electricity which is reserved as spare electricity, and possessing a sufficient charge-discharge cycle performance.

Means for Solving the Problems

To overcome the above-mentioned drawbacks, according to an aspect of the present invention, there is provided a vehicle-use energy storage apparatus which includes an energy storage device having a negative electrode including a negative active material which contains: a first active material made of a carbon material; and a second active material having a higher oxidation potential than the carbon material and having a higher capacity per volume than the carbon material, wherein in performing discharging of the energy storage device, a main discharge reaction occurs in the first active material during a normal time, and the main discharge reaction occurs in the second active material during an emergency time. The vehicle-use energy storage apparatus further includes a transmitting mechanism which transmits a signal at a point of time before a main discharge reaction shifts from a reaction of the first active material to a reaction of the second active material in performing discharging of the energy storage device.

According to another aspect of the present invention, there is provided a vehicle-use discharge system which includes the above-mentioned vehicle-use energy storage apparatus, and is configured to be capable of selecting whether or not discharging is to be continued when the signal is transmitted.

According to another aspect of the present invention, there is provided a discharge control method including a step of selecting whether or not discharging is to be continued when the signal is transmitted using the vehicle-use energy storage apparatus or the vehicle-use discharge system.

According to another aspect of the present invention, there is provided a vehicle-use energy storage device which includes a negative electrode including a negative active material which contains: a first active material made of a carbon material; and a second active material having a higher oxidation potential than the carbon material and having a higher capacity per volume than the carbon material, where the content of the second active material with respect to a total content of the first active material and the second active material is 8 mass % or less.

According to another aspect of the present invention, there is provided a vehicle-use energy storage apparatus which includes: an energy storage device having a negative electrode including a negative active material which contains: a first active material made of a carbon material; and a second active material having a higher oxidation potential than the carbon material and having a higher discharge capacity per volume than the carbon material; and a transmitting mechanism configured to transmit a signal in a vicinity of a region where a main discharge reaction of the negative electrode shifts from a discharge reaction of the first active material to a discharge reaction of the second active material in performing discharging of the energy storage device.

Advantages of the Invention

According to the present invention, it is possible to provide a vehicle-use energy storage apparatus, a vehicle-use discharge system, a discharge control method, and a vehicle-use energy storage device each capable of ensuring a sufficient amount of electricity as an amount of electricity used during a normal use time while ensuring an amount of electricity which is reserved as spare electricity, and possessing a sufficient charge-discharge cycle performance.

MODE FOR CARRYING OUT THE INVENTION

Figure 1:
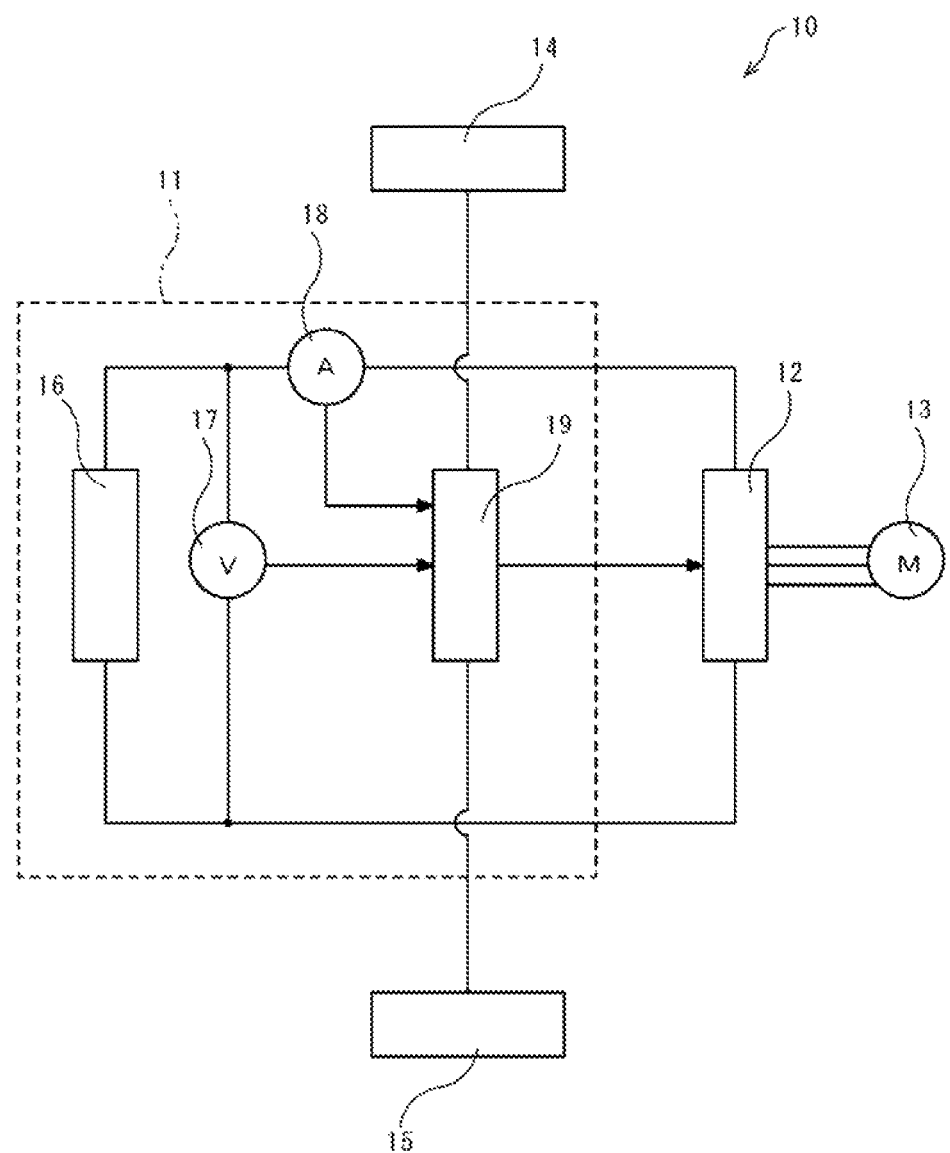
FIG. 1 is a schematic view showing a vehicle-use discharge system according to an embodiment of the present invention.

A vehicle-use energy storage apparatus according to an aspect of the present invention is a vehicle-use energy storage apparatus which includes an energy storage device having a negative electrode including a negative active material which contains: a first active material made of a carbon material; and a second active material having a higher oxidation potential than the carbon material and having a higher capacity per volume than the carbon material, wherein in performing discharging of the energy storage device, a main discharge reaction occurs in the first active material during a normal time, and the main discharge reaction occurs in the second active material during an emergency time.

The vehicle-use energy storage apparatus is configured such that a main discharge reaction occurs in the first active material made of a carbon material during a normal time, and a main discharge reaction occurs in the second active material having a higher oxidation potential than the carbon material and having a higher capacity per volume than the carbon material during an emergency time. A carbon material has favorable durability to a charge-discharge cycle compared to other active materials. Accordingly, by using a carbon material as the first active material mainly used during a normal time, the energy storage apparatus can exhibit sufficient durability capable of coping with repeated charging and discharging. Further, the negative active material contains the second active material in addition to the first active material. Accordingly, when a discharge reaction of the first active material is finished and further discharge is necessary, such further discharge can be performed using the second active material. In this case, since the second active material has a higher oxidation potential than the first active material (carbon material), discharging substantially does not occur during a discharge reaction of the first active material. Accordingly, when a normal use is repeated, a charge and discharge reaction does not substantially occur in the second active material and hence, the second active material is minimally deteriorated. Further, the second active material has a higher capacity per volume than the first active material and hence, even when the content of the second active material is relatively small, the second active material can ensure a certain level of discharge capacity during an emergency time. Accordingly, while the content of the second active material can be reduced relatively, the content of the first active material can be increased so that a sufficient amount of electricity can be ensured during a normal use time.

Herein, "during an emergency time" means a case where when a discharge reaction of a first active material used during a normal time is finished, and additional discharging becomes necessary.

It is preferable that a rate of a discharge capacity attributed to the second active material in the energy storage device be 50% or less. In this manner, by setting a discharge capacity reserved for being used during an emergency time relatively small, a discharge capacity (amount of electricity) which can be used during a normal time can be increased and hence, the energy storage apparatus can be used for a long period during a normal time.

It is preferable that the second active material be a simple element selected from a group consisting of silicon, tin, and aluminum, a compound which contains these elements, or a combination of the simple element and the compound. These simple element and compound has sufficiently higher oxidation potential and capacity per volume than a carbon material and hence, these simple element and compound effectively function as the second active material used during an emergency time. These simple element and compound exhibit a large change in volume attributed to charging or discharging and hence, these simple element and compound are inferior to the first active material in a charge-discharge cycle performance. Accordingly, by using these materials as the second active material used only during an emergency time, the decrease of a lifetime of the vehicle-use energy storage apparatus can be suppressed.

It is preferable that the content of the second active material with respect to a total content of the first active material and the second active material be 8 mass % or less. By setting the content of the second active material to 8 mass % or less, the content of the first active material can be increased and hence, an amount of electricity which can be used during a normal use time can be increased.

It is preferable that the first active material be graphite. Graphite has a sufficient discharge capacity and sufficient durability. Accordingly, by using graphite as the first active material, an amount of electricity used during a normal time can be made more sufficient and hence, a charge-discharge cycle performance can be also increased. Herein, "graphite" means a carbon material where an average lattice spacing (d002) between (002) faces determined by a wide angle X ray diffraction method is less than 0.340 nm.

It is preferable that the vehicle-use energy storage apparatus further include a transmitting mechanism which transmits a signal at a point of time before a main discharge reaction shifts from a reaction of the first active material to a reaction of the second active material in performing discharging of the energy storage device. With such a signal, it is understood that a discharge reaction of the first active material is finished, and for example, an occupant (usually a driver) can determine whether or not discharging is to be continued.

It is preferable that the signal be transmitted when a voltage becomes lower than a voltage preliminarily set in the energy storage device or when a discharge amount of electricity becomes higher than a discharge amount of electricity preliminarily set in the energy storage device. With such a configuration, it is possible to estimate with high certainty a timing just before a main discharge reaction shifts from a reaction of the first active material to a reaction of the second active material.

A vehicle-use discharge system according to an aspect of the present invention is a vehicle-use discharge system which includes the vehicle-use energy storage apparatus, and is configured to be capable of selecting whether or not discharging is to be continued when the signal is transmitted. According to the vehicle-use discharge system, while ensuring a sufficient amount of electricity as an amount of electricity used during a normal time, discharging can be performed using the second active material when necessary even during an emergency time where an amount of electricity to be used during a normal time is consumed. Further, only the first active material is substantially used during a normal time and hence, the vehicle-use discharge system possesses a sufficient charge-discharge cycle performance and can be used for a long period.

A discharge control method according to an aspect of the present invention is a discharge control method having a step of selecting whether or not discharging is to be continued when the signal is transmitted using the vehicle-use energy storage apparatus or the vehicle-use discharge system. According to this discharge control method, while ensuring a sufficient amount of electricity as an amount of electricity used during a normal time, even when an amount of electricity used during a normal time is consumed, discharging can be performed using the second active material when necessary. Further, only the first active material is substantially used during a normal time and hence, the vehicle-use energy storage apparatus and the vehicle-use discharge system can be used for a long period.

A vehicle-use energy storage device according to an aspect of the present invention is a vehicle-use energy storage device which includes a negative electrode including a negative active material which contains: a first active material made of a carbon material; and a second active material having a higher oxidation potential than the carbon material and having a higher capacity per volume than the carbon material, and the content of the second active material with respect to a total content of the first active material and the second active material is 8 mass % or less. When vehicle-use energy storage device is used in an energy storage apparatus of a vehicle, while ensuring an amount of electricity reserved as spare electricity, a sufficient amount of electricity can be ensured as an amount of electricity used during a normal time and hence, the vehicle-use energy storage device can also acquire a sufficient charge-discharge cycle performance.

A vehicle-use energy storage apparatus according to another aspect of the present invention is a vehicle-use energy storage apparatus which includes: an energy storage device having a negative electrode including a negative active material which contains: a first active material made of a carbon material; and a second active material having a higher oxidation potential than the carbon material and having a higher discharge capacity per volume than the carbon material; and a transmitting mechanism configured to transmit a signal in a vicinity of a region where a main discharge reaction of the negative electrode shifts from a discharge reaction of the first active material to a discharge reaction of the second active material in performing discharging of the energy storage device. Herein, "in a vicinity of a region where a main discharge reaction of the negative electrode shifts from a discharge reaction of the first active material to a discharge reaction of the second active material" means a point of time that the discharge reaction of the first active material occurs, and also includes a point of time that a finishing time of the discharge reaction of the first active material can be estimated with predetermined accuracy.

Finishing of the discharge reaction of the first active material can be understood based on this signal and hence, for example, an occupant (usually a driver) can determine whether or not discharging is to be continued. The first active material is a carbon material having favorable durability against a charge-discharge cycle compared to other active materials. Accordingly, by finishing discharging of the energy storage device at the time of finishing of the discharge reaction of the first active material, lowering of a cycle performance attributed to a charge-discharge reaction of the second active material can be suppressed. Accordingly, it is possible to provide a vehicle-use energy storage apparatus which possesses a sufficient cycle performance and can be used for a long period. Further, the second active material has a higher oxidation potential than the first active material and hence, at a point of time that a main discharge reaction of the negative electrode shifts from a discharge reaction of the first active material to a discharge reaction of the second active material, a voltage of the energy storage device is largely changed. By detecting such a change, a finishing time of a discharge reaction of the first active material can be detected with high accuracy, and can transmit a signal accordingly.

When further discharge becomes necessary after a discharge reaction of the first active material is finished, further discharge can be performed using the second active material. Accordingly, when necessary, it is possible to take out an amount of electricity larger than an amount of electricity acquired by discharge of the first active material.

Hereinafter, the vehicle-use discharge system according to one embodiment of the present invention is described and, along with such description, the vehicle-use energy storage apparatus according to one embodiment of the present invention provided to such a vehicle-use discharge system, and a discharge control method according to one embodiment of the present invention which uses the vehicle-use discharge system and the vehicle-use energy storage apparatus are described. The vehicle-use energy storage device according to one embodiment of the present invention is also described in the last part of this embodiment.

<Vehicle-Use Discharge System>

The vehicle-use discharge system 10 shown in FIG. 1 includes: an energy storage apparatus 11 (vehicle-use energy storage apparatus); an inverter 12; a motor 13; an output part 14; and an input part 15. The vehicle-use discharge system 10 is mounted on a vehicle such as an electric vehicle (EV), a hybrid electric vehicle (HEV) or a plug-in hybrid vehicle (PHV) in which an energy storage apparatus is used as a power source.

<Energy Storage Apparatus>

The energy storage apparatus 11 includes: an energy storage device 16; a voltage sensor 17; a current sensor 18; and a control part 19 (transmitting mechanism). The energy storage apparatus 11 is the vehicle-use energy storage apparatus according to one embodiment of the present invention.

The energy storage device 16 has a negative electrode including a negative active material containing a first active material made of carbon material and a second active material having a higher oxidation potential than the carbon material and having a higher capacity per volume than the carbon material. In performing discharging by the energy storage device 16, a main discharge reaction occurs in the first active material during a normal time, and the main discharge reaction occurs in the second active material during an emergency time. The energy storage device 16 is described in detail later.

The voltage sensor 17 is connected to positive and negative output terminals of the energy storage device 16. A voltage of the energy storage device 16, that is, a potential difference between electrodes can be measured by the voltage sensor 17.

The current sensor 18 is connected between the positive output terminal of the energy storage device 16 and the inverter 12 which is a load of the energy storage device 16. A discharge current of the energy storage device 16 can be measured by the current sensor 18.

The control part 19 receives a measured value of a voltage of the energy storage device 16 from the voltage sensor 17 and a measured value of a discharge current amount of the energy storage device 16 from the current sensor 18. The control part 19 calculates a discharge current amount from a measured amount of the above-mentioned discharge current. In performing discharging by the energy storage device 16, the control part 19 functions as a transmitting mechanism for transmitting a signal at a point of time before a main discharge reaction is shifted from a reaction of a first active material to a reaction of a second active material. To be more specific, the control part 19 is configured to transmit a signal when a voltage of the energy storage device 16 becomes less than a preset voltage (hereinafter referred to as "set voltage") or when a discharge amount of electricity of the energy storage device 16 becomes larger than a preset discharge amount of electricity (hereinafter also referred to as "set discharge amount of electricity"). An oxidation potential (discharge potential) of the first active material is lower than an oxidation potential (discharge potential) of the second active material and hence, when the reaction starts to shift from the reaction of the first active material to the reaction of the second active material, a discharge potential of the negative electrode is increased. As a result, a battery voltage is lowered. By preliminarily acquiring a discharge capacity of the first active material based on the content of the first active material and by comparing the discharge capacity of the first active material and an actual discharge amount of electricity with each other, a discharge state of the first active material can be estimated. A signal from the control part 19 (signal transmitting mechanism) is transmitted to the output part 14.

In another embodiment of the present invention, the control part 19 functions as a transmitting mechanism for transmitting a signal in the vicinity of a region where a main discharge reaction of the negative electrode is shifted from a discharge reaction of the first active material to a discharge reaction of the second active material in performing discharging of the energy storage device 16. To be more specific, the control part 19 is configured to transmit a signal when a voltage of the energy storage device 16 becomes less than a set voltage or when a discharge amount of electricity of the energy storage device 16 becomes larger than a set discharge amount of electricity. A signal from the control part 19 (signal transmitting mechanism) is transmitted to the output part 14.

The set voltage may be a voltage at a point of time where a battery voltage is lowered when the main discharge reaction of the negative electrode starts to shift from the reaction of the first active material to the reaction of the second active material, or may be a voltage at a point of time before the main discharge reaction of the negative electrode starts to shift to the reaction of the second active material where a finish time of the discharge reaction of the first active material can be estimated with predetermined accuracy. The set voltage may be a voltage at a point of time before the main discharge reaction of the negative electrode starts to shift to the reaction of the second active material where a time that the main discharge reaction of the negative electrode shifts from the reaction of the first active material to the reaction of the second active material can be estimated with predetermined accuracy. Alternatively, the set voltage may be a voltage at a point of time after the main discharge reaction of the negative electrode shifts to the reaction of the second active material. In this case, it is preferable that the set voltage be a voltage based on which the discharge amount of electricity of the second active material can be estimated with predetermined accuracy.

The set voltage may be changed along with a charge-discharge cycle of the energy storage device 16, but not along with a fixed value. In performing discharging of the energy storage device 16, when a main discharge reaction of the negative electrode shifts from a discharge reaction of a first active material to a discharge reaction of a second active material, a battery voltage largely changes due to a difference in oxidation potential between the first active material and the second active material. The control part 19 may transmit a signal by detecting such a change in voltage. With such a configuration, a time where a main discharge reaction of the negative electrode shifts from a reaction of the first active material to a reaction of the second active material can be estimated with accuracy and hence, the control part 19 can transmit a signal at a proper timing. Further, when a main discharge reaction of the negative electrode shifts to a reaction of the second active material, a change in battery voltage becomes gentle. The control part 19 may transmit a signal at such a point of time where a change in voltage becomes gentle.

A set discharge amount of electricity may be a discharge capacity of a first active material calculated based on the content of the first active material, or may be smaller than a discharge capacity of a first active material. Alternatively, a set discharge amount of electricity may be larger than a discharge capacity of a first active material. That is, a part of a second active material may be used in a discharge reaction before a signal is transmitted. A lower limit of a set discharge amount of electricity is preferably set to 70% of a discharge capacity of a first active material, is more preferably set to 80% of the discharge capacity of the first active material, and is further more preferably set to 90% of a discharge capacity of a first active material. A lower limit of a set discharge amount of electricity may be also set to 100% of a discharge capacity of a first active material. By setting a lower limit of a set discharge amount of electricity within the above-mentioned ranges, lowering of a battery voltage caused by finishing of discharge of a first active material can be easily detected. Accordingly, a time at which a discharge reaction of the first active material finishes can be estimated with accuracy. An upper limit of a set discharge amount of electricity is, beside a discharge amount of electricity of a first active material, preferably set to 30% of a discharge capacity of a second active material, more preferably set to 20% of a discharge capacity of a second active material, and further more preferably set to 10% of a discharge capacity of a second active material. An upper limit of a set discharge amount of electricity is most preferably set to 0% of a discharge capacity of a second active material. In the case where an active material which exhibits large expansion or shrinkage due to a charge-discharge reaction is used as a second active material, by setting an upper limit of a set discharge amount of electricity within the above-mentioned ranges, degradation of a second active material attributed to a charge-discharge reaction of the second active material can be suppressed thus suppressing lowering of a cycle performance.

The control part 19 may transmit the above-mentioned signal based on a combination of a set voltage and a set discharge amount of electricity. To be more specific, the control part 19 may transmit a signal when either one of a condition where a voltage of the energy storage device 16 becomes lower than a set voltage or a condition where a discharge amount of electricity of the energy storage device 16 becomes larger than a set discharge amount of electricity is satisfied. The control part 19 may store a discharge capacity when a voltage of the energy storage device 16 reaches a set voltage of a preceding time, may update a set discharge amount of electricity using a value of the discharge capacity, and may transmit a signal when either one of conditions, that is, a set voltage or an updated set discharge amount of electricity is satisfied. Further, the control part 19 may transmit a signal at a point of time that a predetermined discharge amount of electricity is discharged after a voltage of the energy storage device 16 reaches a set voltage.

The control part 19 also controls the energy storage device 16 and the inverter 12. The control part 19 can be formed of a computer and computer programs. A part of the control part 19 or the entire control part 19 may be formed of a processor made of a semiconductor chip. In the control part 19, a part for transmitting a signal (transmitting mechanism), a part for controlling the energy storage device 16, and a part for controlling the inverter may be formed as separate parts separated from each other, or may be formed as an integral part.

(Constitutional Elements Other than Energy Storage Apparatus)

The inverter 12 converts a direct current voltage which the energy storage device 16 outputs into a three-phase alternating current voltage.

The motor 13 receives a three-phase alternating current voltage from the inverter 12, and generates a torque for driving an electric vehicle.

The output part 14 outputs a signal received from the control part 19. The output part may be a monitor, a lamp, a speaker or the like. That is, in performing discharging of the energy storage device 16, at a point of time before a main discharge reaction shifts from a reaction of a first active material to a reaction of a second active material, such shifting of the main discharge operation is displayed on the monitor, the lamp flickers or an alarm sound is generated from the speaker.

The input part 15 is provided for transmitting an instruction whether or not discharging is to be continued to the control part 19 when the above-mentioned signal is transmitted. The input part 15 may be an acceleration pedal of a vehicle. When an occupant wants to continue discharging, the occupant may continue driving of a vehicle by keeping stepping of the acceleration pedal. On the other hand, when the occupant does not want to continue discharging, the occupant may stop driving of the electric vehicle at a proper timing. The input part 15 may be provided in the form of a switch. In this case, discharging can be continued by turning on the switch, and discharging can be stopped by turning off the switch, for example. Further, the vehicle-use discharge system may be configured such that a power source is switched to a different power source when discharging is not continued.

In this manner, the vehicle-use discharge system 10 is configured to be capable of selecting whether or not discharging is to be continued by an occupant when a signal is transmitted. Alternatively, the vehicle-use discharge system 10 may be configured such that the control part 19 selects whether or not charging is to be continued when a signal is transmitted. In this case, for example, a condition of whether or not discharging is to be continued may be set in advance, and the control part 19 may select whether or not discharging is to be continued based on such a condition.

(Energy Storage Device)

Next, the energy storage device 16 (vehicle-use energy storage device) is described in detail. The energy storage device 16 has a positive electrode, a negative electrode, and a nonaqueous electrolyte. Hereinafter, as one example of the energy storage device, a nonaqueous electrolyte secondary battery is described. Usually, the above-mentioned positive electrode and the negative electrode are stacked to each other or are wound together with a separator interposed therebetween thus forming an electrode assembly where the positive electrode and the negative electrode are made to overlap with each other alternately. The electrode assembly is housed in a case, and the case is filled with the nonaqueous electrolyte. The nonaqueous electrolyte is interposed between the positive electrode and the negative electrode. Further, as the case, a known aluminum case which is usually used as a case of a secondary battery or the like can be used.

(Positive Electrode)

The positive electrode has a positive electrode substrate, and a positive active material layer which is directly disposed on the positive electrode substrate or is disposed on the positive electrode substrate with an intermediate layer interposed therebetween.

The positive electrode substrate has conductivity. As a material for forming the substrate, metal such as aluminum, titanium, tantalum, stainless steel or an alloy of such metal materials is used. Among these materials, it is preferable to use aluminum or an aluminum alloy from a viewpoint of taking into account a balance between a degree of potential resistance, a degree of conductivity and a cost. Further, as a forming mode of the positive electrode substrate, a foil, a vapor deposition film or the like can be named, and a foil is preferably used from a viewpoint of a cost. That is, an aluminum foil is preferably used as the positive electrode substrate. As aluminum or an aluminum alloy, A1085P, A3003P and the like prescribed in JIS-H-4000 (2014) can be exemplified.

The intermediate layer is a cover layer on a surface of the positive electrode substrate, and contains conductive particles such as carbon particles so as to reduce contact resistance between the positive electrode substrate and the positive active material layer. The configuration of the intermediate layer is not particularly limited, and may be formed using a composition which contains a resin binder and conductive particles, for example. Herein, "has conductivity" means that a volume resistance ratio measured in accordance with JIS-H-0505 (1975) is equal to or less than $10^7$ Ω·cm, and "non-conductive" means that the volume resistance ratio is larger than $10^7$ Ω·cm.

The positive active material layer is made of a so-called positive electrode composite containing a positive active material. A positive electrode composite which forms the positive active material layer contains arbitrary components such as a conductive agent, a binder (binding agent), a thickening agent, a filler or the like when necessary.

As the positive active material, for example, a composite oxide expressed by $Li_xMO_y$ (M indicating at least one kind of transition metal) ($Li_xCoO_2$, $Li_xNiO_2$, $Li_xMnO_3$, $Li_xNi_\alpha Co_{(1-\alpha)}O_2$, $Li_xNi_\alpha Mn_\beta Co_{(1-\alpha-\beta)}O_2$ or the like having a layered α-$NaFeO_2$-type crystal structure, $Li_xMn_2O_4$, $Li_xNi_\alpha Mn_{(2-\alpha)}O_4$ or the like having a spinel-type crystal structure), or a polyanion compound expressed by $Li_wMe_x(XO_y)_z$ (Me indicating at least one kind of transition metal, X being P, Si, B, V or the like, for example) ($LiFePO_4$, $LiMnPO_4$, $LiNiPO_4$, $LiCoPO_4$, $Li_3V_2(PO_4)_3$, $Li_2MnSiO_4$, $Li_2CoPO_4F$ or the like) can be named. An element or a polyanion in these compounds may be partially replaced with another element or other anion species. In the positive active material layer, one kind of these compounds may be used singly or may be used in a state where two or more kinds of compounds are used in a mixed form.

The conductive agent is not particularly limited provided that the conductive agent is a conductive material which does not adversely affect a performance of the energy storage device. As such a conductive agent, natural or artificial graphite, carbon black such as furnace black, acetylene black and Ketjen black, metal, conductive ceramics or the like can be named. As the shape of the conductive agent, a powdery form, a fibrous form or the like can be named.

As a material of the binder (binding agent), a fluororesin (polytetrafluoroethylene (PTFE), polyvinylidene fluoride (PVDF) or the like), a thermoplastic resin such as polyethylene, polypropylene or polyimide, elastomer such as ethylene-propylene-diene rubber (EPDM), sulfonated EPDM, styrene-butadiene rubber (SBR), fluororubber or the like, polysaccharide polymer or the like can be named.

As a material of the thickening agent, a polysaccharide polymer such as carboxymethyl cellulose (CMC), methyl cellulose and the like can be named. Further, when the thickening agent has a functional group reactable with lithium, it is preferable to preliminarily deactivate the functional group by methylation or the like.

A material of the filler is not particularly limited provided that a battery performance is not adversely affected by the material. As a main component of the filler, a polyolefin such as polypropylene and polyethylene, silica, alumina, zeolite, glass, carbon or the like can be named.

(Negative Electrode)

The negative electrode has a negative electrode substrate, and a negative active material layer which is directly disposed on the negative electrode substrate or is disposed on the negative electrode substrate with an intermediate layer interposed therebetween. The intermediate layer has substantially the same configuration as the intermediate layer of the positive electrode.

Although the negative electrode substrate can be formed substantially in the same manner as the positive electrode substrate, as a material for forming the negative electrode substrate, metal such as copper, nickel, stainless steel, nickel plated steel, or an alloy of these metal materials is used, and copper and a copper alloy are preferably used. That is, a copper foil is preferably used as the negative electrode substrate. As a copper foil, a rolled copper foil, an electrolytic copper foil or the like can be exemplified.

The negative active material layer is made of a so-called negative electrode composite containing a negative active material. A negative electrode composite which forms the negative active material layer contains arbitrary components such as a conductive agent, a binder (binding agent), a thickening agent, a filler or the like when necessary. It is possible to use the arbitrary components such as the conductive agent, the binding agent, the thickening agent, the filler and the like which are substantially equal to the arbitrary components used in the positive active material layer.

The negative active material includes a negative active material containing a first active material made of a carbon material, and a second active material having a higher oxidation potential than a carbon material and having a higher capacity per volume than a carbon material.

As a carbon material used which forms a first active material, graphite and amorphous carbon can be named. As amorphous carbon, hardly graphitizable carbon (acetylene black, furnace black, Ketjen black or the like), easily graphitizable carbon or the like can be named. As the first active material (carbon material), graphite is preferably used. With respect to the first active material, a lower limit of a D50 particle size where a cumulative volume in particle size distribution of a particle size becomes 50% is preferably set to 1 μm, more preferably set to 2 μm, and further more preferably set to 5 μm. An upper limit of the D50 particle size of the first active material is preferably set to 30 μm, more preferably set more to 20 μm. An upper limit of the D50 particle size of the first active material may be set to 10 μm. By setting the D50 particle size to the above-mentioned range, it is possible to acquire a nonaqueous electrolyte energy storage device having a more favorable charge-discharge cycle performance.

The second active material is not particularly limited provided that the second active material is a negative active material having a higher oxidation potential than a carbon material and having a higher capacity per volume than a carbon material. The second active material is preferably formed of a simple element selected from a group consisting of silicon, tin, and aluminum, a compound which contains these elements, or a combination of the above-mentioned simple element and the compound. As the compound, an oxide, a nitride, an alloy or the like can be named. Among these materials, silicon or a compound containing silicon is preferably used as the second active material, and silicon is more preferably used as the second active material. Silicon has a high capacity per volume, and particularly effectively functions as the second active material used only during an emergency time when a relatively small amount of silicon is contained in the negative electrode. Further, these active materials are inferior to the first active material in a cycle performance due to occurrence of isolation brought about by the repetition of charging and discharging. Also from such a viewpoint, it is possible to acquire a large advantageous effect when these active materials are used as the second active material which is used only during an emergency time.

Figure 2A:
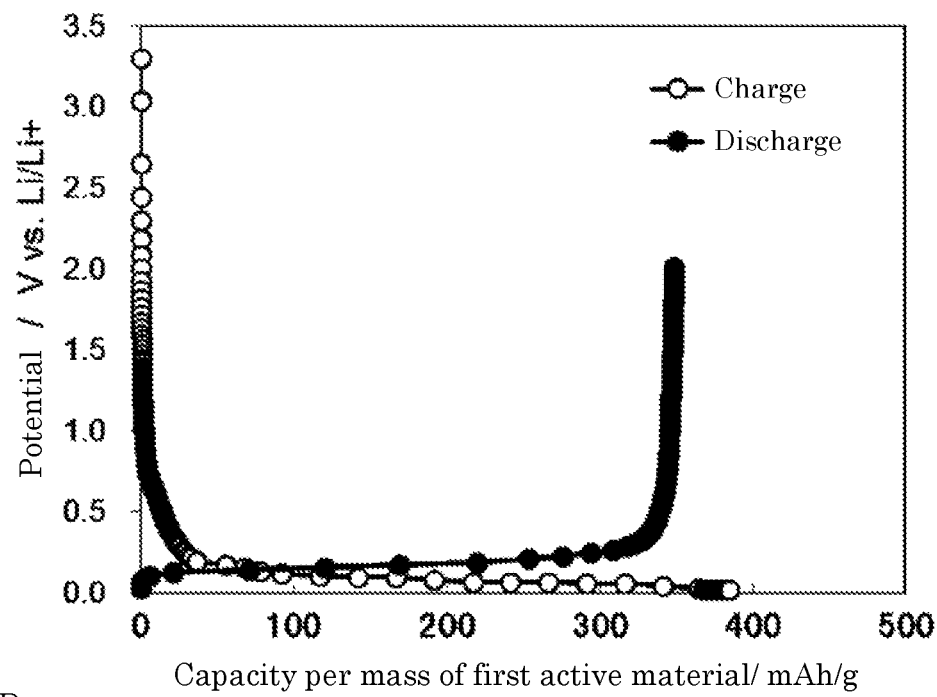
FIG. 2A is a discharge curve of graphite which is used as a first active material.
Figure 2B:
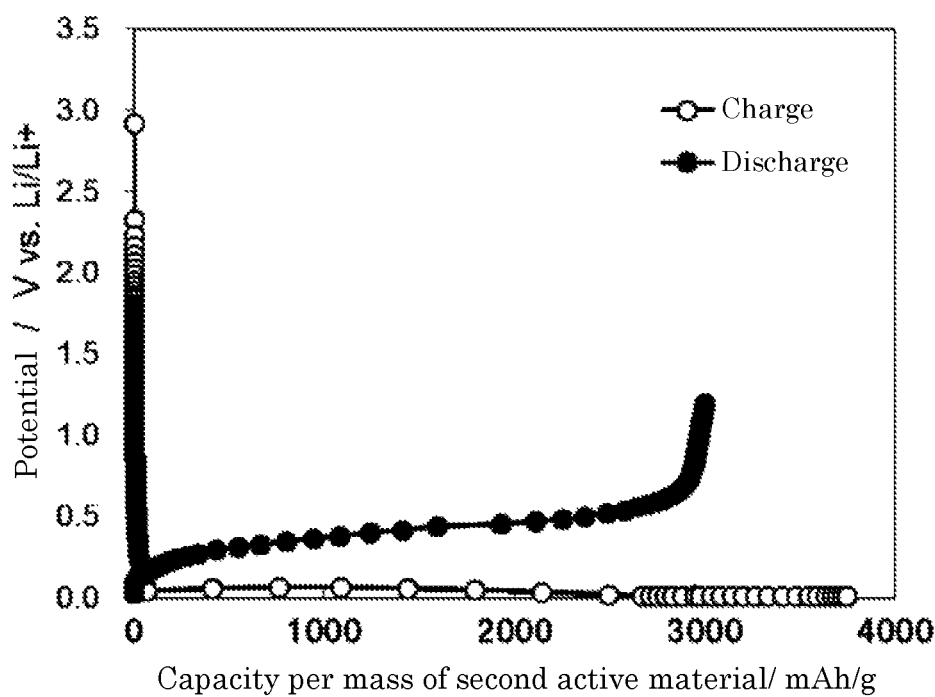
FIG. 2B is a discharge curve of silicon which is used as a second active material.

FIG. 2 shows a discharge curve (FIG. 2(a)) of graphite used as a first active material, and a discharge curve (FIG. 2(b)) of silicon (Si nano particle) used as a second active material. From FIG. 2(a) and FIG. 2(b), it is understood that silicon has a higher oxidation potential (discharge potential) than graphite, and has a higher discharge capacity than graphite.

As the shape of the second active material, it is preferable that the second active material have a particulate form, and more preferable that the second active material be formed of nano particles. Herein, "nano particles" means particles where D50 particle size which indicates that a cumulative volume in particle size distribution of a particle size becomes 50% falls within a range of from 1 nm or more and less than 1 μm. The D50 particle size is a value obtained by a laser diffraction type particle size distribution measurement. An upper limit of the D50 particle size of the second active material is preferably set to 200 nm, more preferably set to 150 nm, and further more preferably set to 100 nm. A lower limit of the D50 particle size of the second active material may be set to 1 nm, and is preferably set to 10 nm, and more preferably set to 20 nm. By setting the D50 particle size of the second active material within the above-mentioned ranges, even when a change in volume occurs in the second active material due to charging and discharging, the second active material is minimally pulverized. By using such a fine particulate second active material, the second active material can be filled to pore portions in the first active material or the like thus increasing the density of the active material. To provide the structure where an expansion of a volume of the second active material is absorbed by the pore portions of the first active material so that an expansion of a volume of the negative active material layer is alleviated in an expansion of a volume of the second active material attributed to charging, a rate between a D50 particle size of the first active material and a D50 particle size of the second active material (D50 particle size of the first active material/ D50 particle size of the second active material) is preferably set to 4 or more, and more preferably set to 7 or more, and further more preferably set to 10 or more. With such setting, it is possible to acquire a high capacity even during an emergency time while ensuring a sufficient capacity during a normal use time.

Figure 3A:
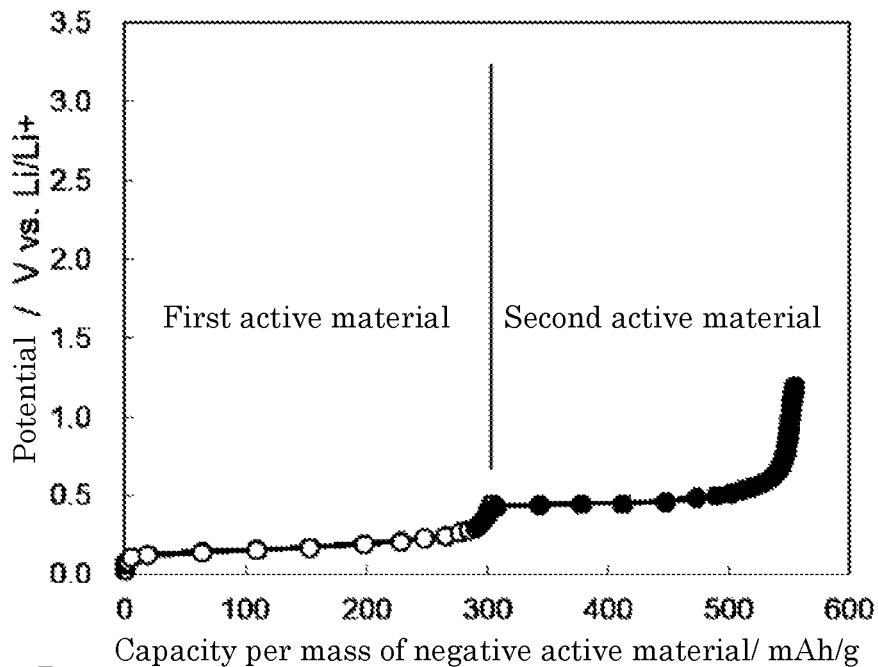
FIG. 3A is a discharge curve of a negative active material made of graphite and silicon (graphite:silicon=90:10).
Figure 3B:
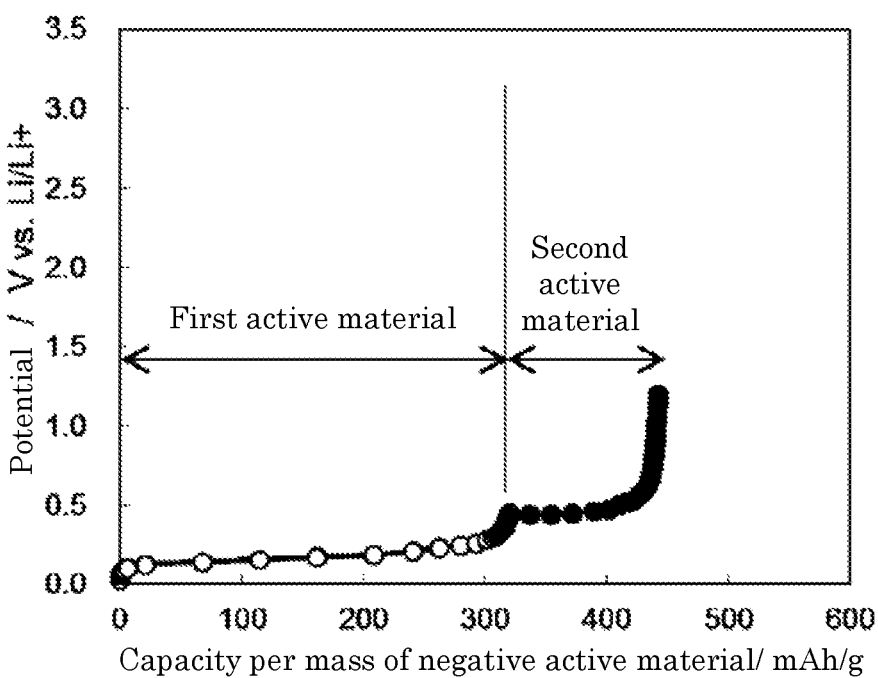
FIG. 3B is a discharge curve of a negative active material made of graphite and silicon (graphite:silicon=95:5).

FIG. 3 shows a discharge curve of a negative active material formed by mixing graphite used as a first active material and silicon used as a second active material. FIG. 3(a) shows a discharge curve in a case where the content of silicon with respect to a total content of graphite and silicon is set to 10 mass %. FIG. 3(b) shows a discharge curve in a case where the content of silicon with respect to a total content of graphite and silicon is set to 5 mass %. Both discharge curves show a fact that, a discharge reaction of graphite occurs in an initial discharge and, thereafter, a discharge potential of the discharge reaction of graphite is increased, and a discharge reaction of silicon occurs. Further, in a case where the content of silicon is 10 mass %, a rate of a discharge capacity based on graphite is approximately 50%. On the other hand, in a case where the content of silicon is 5 mass %, a rate of discharge capacity based on graphite is approximately 70%. In general, an electric vehicle uses only an amount of electricity which is approximately 70% of a rated capacity of a battery, and when an amount of electricity becomes lower than approximately 30% of the rated capacity of the battery, the supply of electricity is performed. Accordingly, a discharge capacity based on the second active material used during an emergency time is preferably set to approximately 30%.

Figure 4:
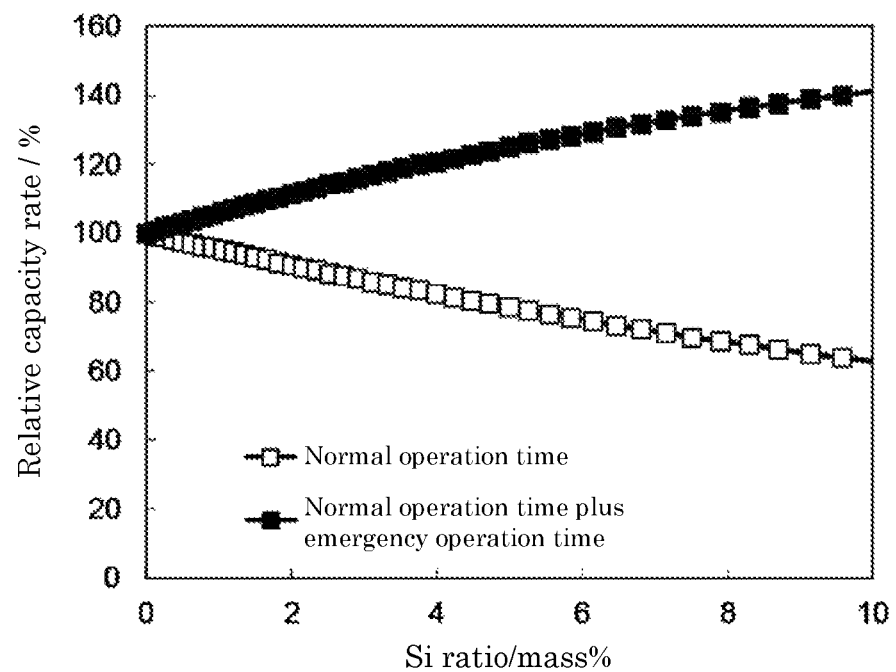
FIG. 4 is a graph showing a trial calculation value of a discharge capacity in an energy storage device which uses a negative active material made of graphite and silicon.

FIG. 4 shows a graph based on a result of a trial calculation of a discharge capacity of a battery with respect to the content of the second active material in a negative active material. In FIG. 4, the content of silicon (Si) used as a second active material is taken on an axis of abscissas. A relative value of a discharge capacity obtained using a discharge capacity per volume of the negative active material made of only graphite which forms the first active material as the reference is taken on an axis of ordinates. The trial calculation is based on the following conditions.

positive active material: $LiNi_{1/3}Co_{1/3}Mn_{1/3}O_2$
positive electrode discharge capacity: 140 mAh/g
mass of coating: 20 mg/cm$^2$
positive active material density: 4.8 g/cm$^3$
N/P ratio: 1
first active material: graphite
second active material: silicon
graphite discharge capacity: 372 mAh/g
graphite density: 2.3 g/cm$^3$
silicon discharge capacity: 4200 mAh/g
silicon density: 0.58 g/cm$^3$ A true density of silicon is approximately 2.33 g/cm$^3$. However, by taking into account a fact that a volume expansion ratio of silicon at the time of charging is approximately 400%, to provide an electrode having pores which can absorb the expansion of volume of silicon, a trial calculation was performed by setting a density of silicon to ¼ of the true density. Further, the trial calculation was performed under a condition that graphite is partially replaced with silicon such that a volume of the negative active material becomes equal to a volume of a negative active material made of only graphite.

In FIG. 4, for example, there is a tendency that when a content rate of silicon which forms a second active material is 10 mass %, a rate of a discharge capacity during a normal time is less than 50% so that frequency of charging is increased whereby usability during a normal time is lowered.

Taking this tendency into account, an upper limit of the content of a second active material with respect to a total content of a first active material and a second active material may be set to 10 mass %, for example. However, an upper limit of the content of a second active material is preferably set to 8 mass %, more preferably set to 6 mass %, and further more preferably set to 5 mass %. On the other hand, a lower limit of the content of the second active material is preferably set to 1 mass %, and more preferably set to 3 mass %. By setting the content of a second active material to the above-mentioned ranges, an amount of electricity used during a normal time can be increased while ensuring a capacity which can be used during an emergency time.

An upper limit of a rate of a discharge capacity attributed to a second active material in the energy storage device is preferably set to 50%, more preferably set to 40%, and further more preferably set to 30%. On the other hand, a lower limit of the rate of a discharge capacity is preferably set to 5%, more preferably set to 10%, and further more preferably set to 20%. By setting a rate of the discharge capacity attributed to a second active material to the above-mentioned ranges, an amount of electricity which is used during a normal time can be increased while ensuring a capacity which can be used during an emergency time.

A negative composite (negative active material layer) may contain a typical nonmetallic element such as B, N, P, F, Cl, Br, and I, a typical metallic element such as Li, Na, Mg, Al, K, Ca, Zn, Ga, and Ge, and a transition metallic element such as Sc, Ti, V, Cr, Mn, Fe, Co, Ni, Cu, Mo, Zr, Ta, Hf, Nb, and W.

(Separator)

As a material for forming the separator, a woven fabric, a non-woven fabric, a porous resin film or the like is used, for example. Among these materials, a porous resin film is preferably used from a viewpoint of ensuring a strength, and a non-woven fabric is preferably used from a viewpoint of acquiring a liquid holding property of a nonaqueous electrolyte. As a main component of the separator, for example, polyolefin such as polyethylene, polypropylene is preferably used from a viewpoint of ensuring a strength, and polyimide, aramid or the like is preferably used from a viewpoint of an oxidation decomposition resistance. These resins may be used in the form of a composite. A separator obtained by stacking an inorganic layer on a surface of a substrate made of a resin may be also used.

(Non-Aqueous Electrolyte)

The nonaqueous electrolyte contains a non-aqueous solvent, and electrolyte salt which is dissolved in the non-aqueous solvent. The nonaqueous electrolyte may contain other additives.

As a non-aqueous solvent, a known non-aqueous solvent which is usually used as non-aqueous solvent of a general nonaqueous electrolyte for an energy storage device can be used. As a non-aqueous solvent, cyclic carbonate, chain carbonate, ester, ether, amide, sulfone, lactone, nitrile or the like can be named.

As a cyclic carbonate, ethylene carbonate (EC), propylene carbonate (PC), butylene carbonate (BC), vinylene carbonate (VC), vinyl ethylene carbonate (VEC), chloroethylene carbonate, fluoroethylene carbonate (FEC), difluoroethylene carbonate (DFEC), styrene carbonate, catechol carbonate, 1-phenyl vinylene carbonate, 1,2-diphenyl vinylene carbonate or the like can be named.

As a chain carbonate, dimethyl carbonate (DEC), dimethyl carbonate (DMC), ethylmethyl carbonate (EMC), diphenyl carbonate or the like can be named.

As an electrolyte salt, a known electrolyte salt which is usually used as an electrolyte salt of a general nonaqueous electrolyte for an energy storage device can be used. Although lithium salt, sodium salt, potassium salt, magnesium salt, onium salt or the like can be named as the electrolyte salt, lithium salt is preferably used.

As the lithium salt, inorganic lithium salt such as $LiPF_6$, $LiPO_2F_2$, $LiBF_4$, $LiClO_4$, $LiN(SO_2F)_2$, lithium salt having fluorinated hydrocarbon group such as $LiSO_3CF_3$, $LiN(SO_2CF_3)_2$, $LiN(SO_2C_2F_5)_2$, $LiN(SO_2CF_3)(SO_2C_4F_9)$, $LiC(SO_2CF_3)_3$, and $LiC(SO_2C_2F_5)_3$ can be named.

<Discharge Control Method>

Hereinafter, as a method of using the vehicle-use discharge system 10 and the energy storage apparatus 11 (vehicle-use energy storage apparatus) shown in FIG. 1, a discharge control method according to one embodiment of the present invention is described.

The discharge control method according to one embodiment of the present invention is a discharge control method having a step of selecting whether or not discharging is to be continued when a signal is transmitted using the energy storage apparatus 11 (vehicle-use energy storage apparatus) or the vehicle-use discharge system 10.

The discharge control method includes:

a normal discharging step of performing normal discharging by discharging mainly based on a discharge reaction of a first active material; and a selecting step of selecting whether or not the discharging is to be continued when a signal is transmitted from the transmitting mechanism (control part 19).

That is, during driving of a vehicle including the energy storage apparatus 11 or the vehicle-use discharge system 10, during a normal time, a main discharge reaction occurs in a first active material (carbon material) having a lower oxidation potential than a second active material (normal discharging step). The first active material is contained as a main active material of a negative active material and hence, the energy storage apparatus 11 or the vehicle-use discharge system 10 can ensure a sufficient amount of electricity. Further, during a normal use state, charging and discharging of the first active material are repeated. However, the first active material is made of a carbon material thus exhibiting a sufficient charge-discharge cycle performance.

When discharging (driving of a vehicle) progresses, at a point of time before a main discharge reaction shifts from a reaction of a first active material to a reaction of a second active material, a signal is transmitted from the transmitting mechanism (control part 19). As described previously, such a transmitting timing can be set to a timing at which a voltage of the energy storage device 16 becomes lower than a preset voltage, a timing at which a discharge amount of electricity of the energy storage device 16 becomes larger than a preset discharge amount of electricity or the like, and can be set based on measurement values of the voltage sensor 17 and the current sensor 18. As described previously, the signal transmitting timing is not limited to a point of time before a main discharge reaction shifts from a reaction of a first active material to a reaction of a second active material, and may be set to a timing after a main discharge reaction shifts to a reaction of a second active material. Further, the signal is outputted from the output part 14 as a sound, an image light or the like. With such a configuration, an occupant can recognize that a discharge reaction of a first active material will be finished, that is, a fact that a remaining amount of electricity is lowered so that an emergency time is drawing near.

When an occupant selects the continuation of discharging in the above-mentioned selecting step, that is, when the occupant selects the continuation of driving of a vehicle, the occupant can simply continue driving as is. After a discharge reaction of a first active material is finished, that is, during an emergency time, a discharge reaction of a second active material becomes a main discharge reaction. The second active material has a high capacity per volume and hence, even when the content of the second active material is small, driving of the vehicle (discharging) for a relatively long period becomes possible.

On the other hand, when the occupant selects non-continuation of discharging in the selecting step, the supply of electricity is performed at an electricity supply station or the like, for example. Alternatively, when the vehicle is a vehicle including a different power source besides the energy storage apparatus 11 such as a hybrid vehicle, the vehicle can continue traveling using the different power source.

In this manner, according to the vehicle-use energy storage apparatus, the vehicle-use discharge system, and the discharge control method of one embodiment of the present invention, a sufficient amount of electricity can be ensured as an amount of electricity used during a normal use time while ensuring an amount of electricity which is reserved as spare electricity, and a sufficient charge-discharge cycle performance can be also acquired.

<Vehicle-Use Energy Storage Device>

The vehicle-use energy storage device according to one embodiment of the present invention has a negative electrode including a negative active material which contains: a first active material made of a carbon material; and a second active material having a higher oxidation potential than the carbon material and having a higher capacity per volume than the carbon material, and a content of the second active material with respect to a total content of the first active material and the second active material is set to 8 mass % or less.

The vehicle-use energy storage device has substantially the same configuration as the energy storage device 16 provided to the vehicle-use discharge system 10 except that an upper limit of the content of a second active material is specified and hence, the repeated explanation of the substantially equal configuration is omitted. With respect to this vehicle-use energy storage device, a use state is not clearly distinguished between the use during a normal time and the use during an emergency time. However, it is preferable to use the vehicle-use energy storage device in such a manner that a main discharge reaction occurs in the first active material during a normal time, and a main discharge reaction occurs in the second active material during an emergency time in performing discharging of the energy storage device.

<Other Embodiments>

The present invention is not limited to the above-mentioned embodiments, and can be carried out in modes where various alterations or modifications are made besides the above-mentioned modes. For example, the description has been made mainly with respect to the mode where the energy storage device is a nonaqueous electrolyte secondary battery. However, the energy storage device may be other energy storage devices. As such other energy storage devices, a capacitor (an electric double-layered capacitor, a lithium ion capacitor), an energy storage device which includes water as an electrolyte and the like can be named.

Figure 5:
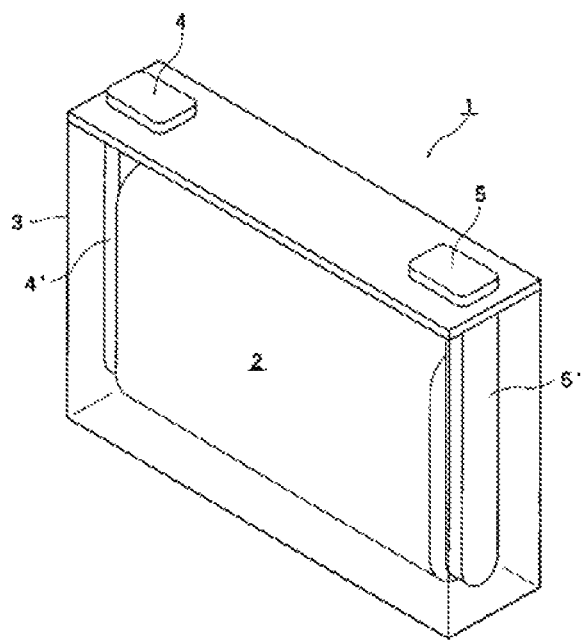
FIG. 5 is an external appearance perspective view showing a nonaqueous electrolyte secondary battery according to an embodiment of a vehicle-use energy storage device of the present invention.

FIG. 5 is a schematic view of a rectangular-shaped non-aqueous secondary battery 1 which is one embodiment of the vehicle-use energy storage device according to the present invention. FIG. 5 shows the inside of a container in a see-through manner. In the nonaqueous electrolyte secondary battery 1 shown in FIG. 5, an electrode assembly 2 is accommodated in a battery case 3 (case). The electrode assembly 2 is formed by winding a positive electrode which includes a positive composite containing a positive active material and a negative electrode which includes a negative active material together with a separator interposed therebetween. The positive electrode is electrically connected to a positive electrode terminal 4 via a positive electrode lead 4', and the negative electrode is electrically connected to a negative electrode 5 via a negative electrode lead 5'. The battery case 3 is filled with a nonaqueous electrolyte.

Figure 6:
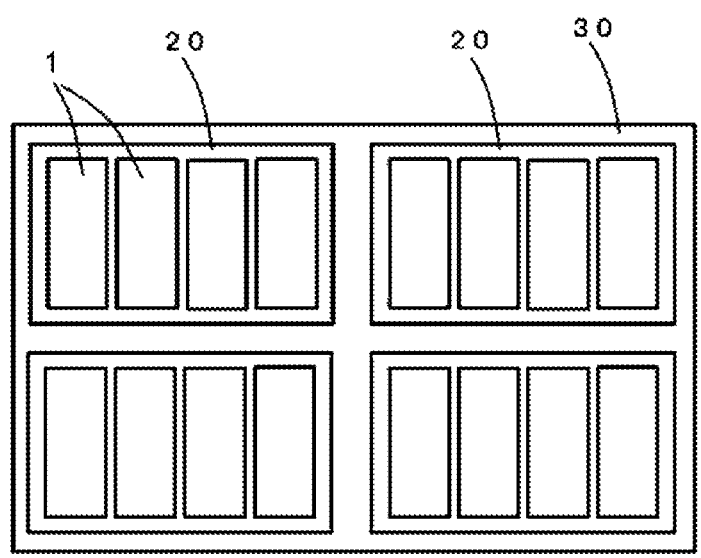
FIG. 6 is a schematic view showing an energy storage apparatus formed by assembling a plurality of nonaqueous electrolyte secondary batteries according to an embodiment of a vehicle-use energy storage device of the present invention.

The configuration of the vehicle-use energy storage device according to the present invention is not particularly limited, and a circular cylindrical battery, a rectangular battery (rectangular-shaped battery), a flat battery and the like can be named as examples of the energy storage device. The present invention can be realized also in the form of an energy storage apparatus including a plurality of the vehicle-use energy storage devices. One embodiment of such an energy storage apparatus is shown in FIG. 6. In FIG. 6, an energy storage apparatus 30 includes a plurality of energy storage units 20. Each energy storage unit 20 includes a plurality of nonaqueous electrolyte secondary batteries.

INDUSTRIAL APPLICABILITY

The present invention is preferably applicable to a power source for vehicles such as an electric vehicle (EV), a hybrid electric vehicle (HEV), and a plug-in hybrid electric vehicle (PHEV), a control system, and a control method.

DESCRIPTION OF REFERENCE SIGNS

1: nonaqueous electrolyte secondary battery
2: electrode group
3: battery case
4: positive electrode terminal
4': positive electrode lead
5: negative electrode terminal
5': negative electrode lead
10: vehicle-use discharge system
11: energy storage apparatus (vehicle-use energy storage apparatus)
12: inverter
13: motor
14: output part
15: input part
16: energy storage device (vehicle-use energy storage device)
17: voltage sensor
18: current sensor
19: control part (transmitting mechanism)
20: energy storage unit
30: energy storage apparatus

The invention claimed is:

1. A vehicle-use energy storage apparatus comprising an energy storage device having a negative electrode including a negative active material which contains: a first active material made of a carbon material; and a second active material having a higher oxidation potential than the carbon material and having a higher discharge capacity per volume than the carbon material, wherein
in performing discharging of the energy storage device, a main discharge reaction occurs in the first active material during a normal time, and the main discharge reaction occurs in the second active material during an emergency time,
the energy storage apparatus further comprises a transmitting mechanism which transmits a signal at a point of time before the main discharge reaction shifts from a reaction of the first active material to a reaction of the second active material in performing the discharging of the energy storage device, so that it can be selected by an occupant whether or not discharging is to be continued when the signal is transmitted, and
a rate of a discharge capacity attributed to the second active material in the energy storage device is 10% or more and 50% or less.

2. The vehicle-use energy storage apparatus according to claim 1, wherein the second active material is a simple element selected from a group consisting of silicon, tin, and aluminum, a compound which contains the element, or a combination of the simple element and the compound.

3. The vehicle-use energy storage apparatus according to claim 1, wherein a content of the second active material with respect to a total content of the first active material and the second active material is 8 mass % or less.

4. The vehicle-use energy storage apparatus according to claim 1, wherein the first active material is graphite.

5. The vehicle-use energy storage apparatus according to claim 1, wherein the signal is transmitted when a voltage becomes lower than a voltage preliminarily set in the energy storage device or when a discharge amount of electricity becomes higher than a discharge amount of electricity preliminarily set in the energy storage device.

6. A vehicle-use discharge system comprising:
    a vehicle-use energy storage apparatus including:
        an energy storage device having a negative electrode including a negative active material which contains:
            a first active material made of a carbon material; and
            a second active material having a higher oxidation potential than the carbon material and having a higher discharge capacity per volume than the carbon material, wherein in performing discharging of the energy storage device, a main discharge reaction occurs in the first active material during a normal time, and the main discharge reaction occurs in the second active material during an emergency time; and
        a transmitting mechanism which transmits a signal at a point of time before the main discharge reaction shifts from a reaction of the first active material to a reaction of the second active material in performing the discharging of the energy storage device, wherein
    the vehicle-use discharge system being configured to be capable of selecting whether or not discharging is to be continued when the signal is transmitted, and
    a rate of a discharge capacity attributed to the second active material in the energy storage device is 10% or more and 50% or less.

7. A discharge control method comprising a step of selecting whether or not discharging is to be continued when the signal is transmitted using the vehicle-use energy storage apparatus according to claim 1.

8. The vehicle-use energy storage apparatus according to claim 1, wherein, when the occupant selects that the discharging is to be continued, the vehicle-use energy storage apparatus continues to discharge after the main discharge reaction shifts from the reaction of the first active material to the reaction of the second active material.

9. The vehicle-use discharge system according to claim 6, wherein, when the vehicle-use discharge system selects that the discharging is to be continued, the vehicle-use energy storage apparatus continues to discharge after the main discharge reaction shifts from the reaction of the first active material to the reaction of the second active material.

* * * * *